(12) United States Patent
Drury

(10) Patent No.: US 7,658,660 B1
(45) Date of Patent: Feb. 9, 2010

(54) GAME CALL APPARATUS

(75) Inventor: Mark A. Drury, St. Peters, MO (US)

(73) Assignee: Flambeau, Inc., Baraboo, WI (US)

( * ) Notice: Subject to any disclaimer, the term of this patent is extended or adjusted under 35 U.S.C. 154(b) by 361 days.

(21) Appl. No.: 11/586,832

(22) Filed: Oct. 26, 2006

(51) Int. Cl.
*A63H 5/00* (2006.01)
*A63H 33/00* (2006.01)

(52) U.S. Cl. .................. 446/206; 446/207; 84/363; 84/383 A

(58) Field of Classification Search ............... 446/202, 446/205–209; 84/363, 364, 383 A, 383 R
See application file for complete search history.

(56) References Cited

U.S. PATENT DOCUMENTS

| | | | | | |
|---|---|---|---|---|---|
| 2,396,359 | A | * | 3/1946 | Yager | 446/208 |
| 2,544,370 | A | * | 3/1951 | Walther | 446/208 |
| 2,556,388 | A | * | 6/1951 | Bicocchi | 446/208 |
| 3,066,444 | A | * | 12/1962 | Dieckmann | 446/207 |
| 3,656,258 | A | * | 4/1972 | Thomas | 446/208 |
| 4,138,800 | A | * | 2/1979 | Lege | 446/207 |
| 4,143,485 | A | * | 3/1979 | Stewart | 446/207 |
| 4,737,130 | A | * | 4/1988 | Mann | 446/207 |
| 4,915,660 | A | * | 4/1990 | Overholt, Sr. | 446/207 |
| 6,234,859 | B1 | * | 5/2001 | Primos et al. | 446/207 |
| 6,234,860 | B1 | * | 5/2001 | Cook | 446/208 |
| 6,435,933 | B1 | * | 8/2002 | Browne | 446/207 |
| 6,527,614 | B1 | * | 3/2003 | Primos | 446/207 |

\* cited by examiner

*Primary Examiner*—Kien T Nguyen
(74) *Attorney, Agent, or Firm*—Quarles & Brady LLP

(57) ABSTRACT

A game call apparatus is provided which has a mouthpiece including an air inlet, a reed positioned in the mouthpiece and vibrating when air is blown into the mouthpiece, and inner and outer tubular sound chambers mounted on an air outlet end of the mouthpiece. The reed is mounted on an air inlet end of the inner tubular sound chamber, and an air outlet end of the inner tubular sound chamber extends into the outer tubular sound chamber. The outer tubular chamber has an air exit end which tapers radially inwardly toward an air exit. The air exit end includes the air exit which is smaller than an air outlet of the inner tubular chamber. The taper and small exit opening of the outer tubular chamber provides a back pressure to air blown into the mouthpiece which produces a realistic game call sound as the reed vibrates.

15 Claims, 6 Drawing Sheets

GAME CALL APPARATUS

BACKGROUND OF THE INVENTION

1. Field of the Invention

This invention relates to game calls for hunting and more particularly to a deer call which will produce the natural sounds of a rutted male deer.

2. Description of the Related Art

Numerous devices have been developed over the years to imitate the sounds of wild animals, particularly game animals. Many efforts have been attempted to simplify and improve the quality of the sounds produced by game calls. Many game calls require extensive practice before they are mastered. Some users simply cannot master the calls even after hours of practice.

In addition to the problem of the difficulty in using a game call, there are several problems that exist with respect to the effectiveness of traditional game calls. Due to the increased popularity of hunting and the perceived effectiveness of using game calls, more hunters are taking the field each year using a variety of different types of game calls. Accordingly, game animals are becoming increasingly discriminating and wary of many traditional calls. Unless the call is capable of imitating with a high degree of precision actual sounds of the game animal, it will likely be ineffective. Many calls on the market today fail to replicate with enough precision the actual sounds made by the game animal and thus serve primarily to frustrate the hunter. These game calls serve more to alert the animals of a potentially dangerous situation than to call game into close range.

Broadly speaking, there are at least three primary categories of game calls that have existed over the years: diaphragm calls, whistle type calls, and reed calls. Diaphragm calls typically utilize a latex membrane stretched across an air passage opening such that the diaphragm vibrates as air passes through the passage. Whistle type calls are primarily used to simulate whistling sounds made by waterfowl. Whistle calls commonly use one or more balls disposed within a resonant chamber to provide a vibrato effect.

Reed-type game calls are probably the most common type of game call. Reed-type game calls typically include a reed disposed adjacent an air passage. Air is forced through the air passage by an operator through a mouthpiece, which causes the reed to vibrate at a certain tone or pitch, creating a sound that is emitted from an outlet of the call. For all reed-type calls, however, whether used for waterfowl, other species of birds, or game such as deer or elk, there is the problem of the ability or the skill level of the user in producing realistic sounds with the call which will attract the desired game animal. Thus, there is a need to produce a game call which will produce realistic sounds with minimum practice and a minimum skill level of the user.

BRIEF SUMMARY OF THE INVENTION

In a principal aspect, the present invention comprises a game hunting call apparatus that is particularly suitable for calling male deer. The call apparatus is of the reed type which is operated by the blowing of air over the reed by a user such as a hunter. The reed and an associated sounding board are positioned within an air passage of a barrel or mouthpiece and into which the call user blows. This reed assembly is mounted on and held in the desired position in the air inlet end of a small barrel or inner tubular sound chamber attached to the mouthpiece. The inner tubular sound chamber extends into and is enclosed by an outer tubular sound chamber. The portion of the inner tubular sound chamber extending into the outer tubular sound chamber has an air outlet through which air escapes from the inner tubular sound chamber into the outer tubular sound chamber. The inner tubular sound chamber also has an adjustable corrugated length at its air outlet end permitting variable location of its air outlet. The outer tubular sound chamber has an air exit opening that is smaller than the air outlet opening of the inner tubular sound chamber. The outer tubular sound chamber also has a radially inward tapered section adjacent to and extending axially away from the air outlet of the inner tubular sound chamber to an exit opening in the outer tubular sound chamber. An air passageway is thus provided through the mouthpiece, reed assembly, inner tubular sound chamber, outer tubular sound chamber and the air exit opening of the latter.

In the operation of the game call apparatus, blowing of air through the reed air passageway and thereby over the reed causes the reed to vibrate and produce a sound which passes into and is modified in the inner tubular sound chamber. The sound is further modified in the outer sound chamber due to the back pressure caused by the tapered construction of the outer tubular sound chamber at the latter's air exit end and the smaller opening size of the exit opening relative to the outlet opening of the inner tubular sound chamber. The dual tubular sound chamber arrangement together with the tapered construction of the outer sound chamber and relatively small exit opening of the latter produces realistic emotionally intense growls or bawls of a rutted buck as well as the grunts and pops of the buck.

It thus may be appreciated that a general object of the invention is to provide a game call apparatus which provides a realistic male deer call. A further object of the invention is to provide a game call apparatus which can be operated to produce a range of calls emulating those of a buck deer in rut. A more specific object of the invention is to provide a reed-type deer call apparatus which can be operated to produce realistic sounds of the growl, grunt, and pop of a rutted buck deer.

Another object of the invention is to provide a game call apparatus having a constriction in the air passageway adjacent the air exit of the call which modifies the sound of the call produced by the apparatus. Another object of the invention is to provide a game call apparatus having a constriction and a relatively small air exit in the air passageway of a game call. Another object of the invention is to provide a game call apparatus having dual sound chambers for modifying the sound of the call produced by the apparatus.

A further object of the invention is to provide a game call apparatus having an adjustable length tubular sound chamber for adjusting the length of the sound chamber to thereby modify the sound of the call produces. A still further object of the invention is to provide a game call apparatus having a sound chamber comprising a rubber material which will modify the sound of the call. A further specific object is to provide a game call apparatus having inner and outer tubular sound chambers both mounted on the mouthpiece of the game call apparatus.

BRIEF DESCRIPTION OF THE DRAWINGS

Further objects and advantages of the invention will appear when taken in conjunction with the accompanying drawings in which.

DETAILED DESCRIPTION OF THE INVENTION

Figure 1:
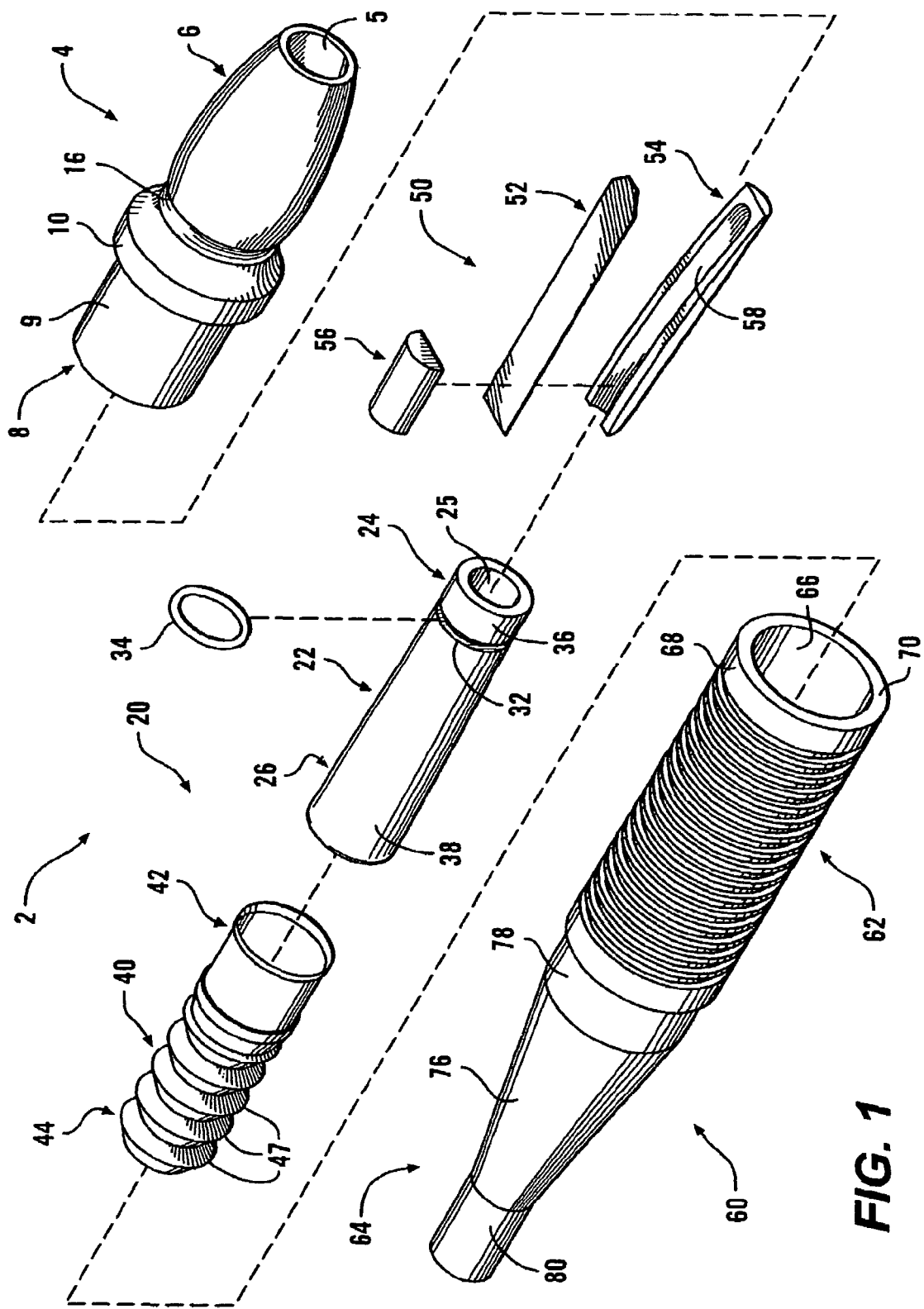
FIG. 1 is an exploded perspective view of a game call apparatus according to the present invention.

Referring generally to the drawings, a game call apparatus 2 according to the present invention is illustrated. The game call apparatus 2 includes a barrel member or mouthpiece 4, an inner tubular sound chamber 20, an outer tubular sound chamber 60, and a reed assembly 50. The mouthpiece 4 has an air passage 18 including an internal cylindrical surface 13 formed by the air inlet end 6 and the air outlet end 8 through which air will pass when the air opening 5 of the mouthpiece 4 is placed in a user's mouth and air is blown into the mouthpiece. A lanyard groove 16 is formed in the mouthpiece approximately midway between the air inlet end 6 and the air outlet end 8 to provide a location for attachment of a lanyard for conveniently carrying the game call apparatus 2. Adjacent the air outlet end 8 of the mouthpiece, an external radially extending annular flange 10 having a flat face 12 is provided for receiving a complimentary flat end face 70 of the outer tubular sound chamber 60 which will be discussed hereinbelow. Also, for snugly receiving the outer tubular sound chamber 60, the air outlet end 8 of the mouthpiece has an external cylindrical surface 9 over which the outer tubular sound chamber 60 can be tightly fitted. The internal cylindrical surface 13 of the air passage 18 adjacent the air outlet end 8 also includes an annular shoulder 14 against which the air inlet end 24 of the inner tubular sound chamber 20 abuts to provide a snug fit of the member 20, as will be discussed further hereinafter. Also, the air passage 18 includes an internal cylindrical surface 15 from which the shoulder 14 extends radially inward and which has a diameter such that the air inlet end 24 of the inner tubular sound chamber 20 is received with a very small clearance.

Figure 3:
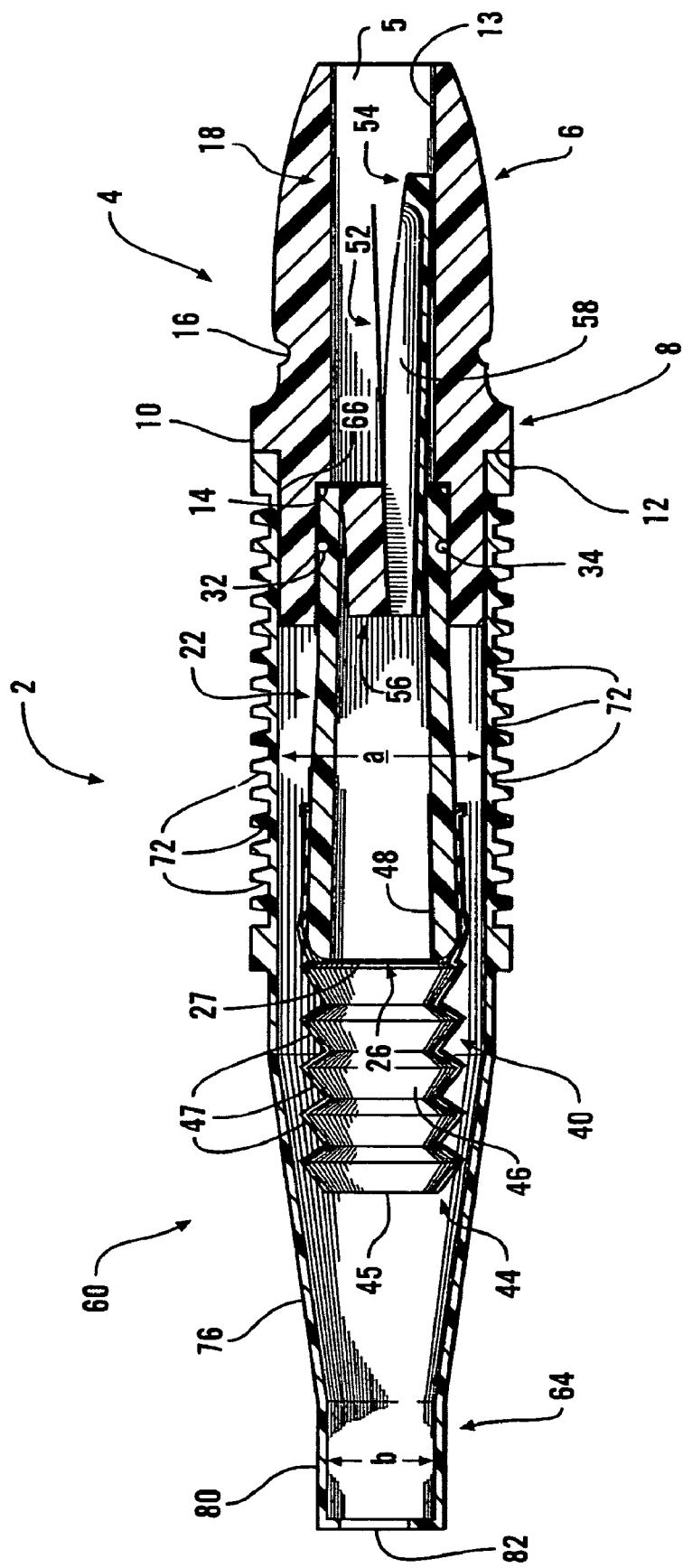
FIG. 3 is a cross-section along the lengthwise axis of the invention.

With reference particularly to FIGS. 1, 3, 5 and 6, the inner tubular sound chamber 20 of the game call apparatus 2 is shown as having a small barrel or first cylindrical extension 22 and a second cylindrical extension 40, both of which may be of a plastic material. The first cylindrical extension 22 includes the air inlet end 24, an air outlet end 26, air inlet 25 and outlet 27 openings respectively in the inlet and outlet ends 24 and 26, and an internal air passageway 28 connecting the air inlet and outlet ends. The air outlet end 26 includes an outer cylindrical surface 38 and an air inlet end 24 having an outer cylindrical surface 36 including a groove 32 in which an o-ring 34 is retained. As can be seen in FIG. 3, when the game call apparatus 2 is assembled, the outer cylindrical surface 36 at the inlet end 24 of the first cylindrical extension 22 fits into the internal cylindrical surface 13 of the mouthpiece 4 and abuts the internal shoulder 14. The combination of the close fit between cylindrical surfaces 13 and 36, the abutment of the end 24 against the internal shoulder 14 and the sealing effect of the o-ring 34 between the cylindrical surfaces 13 and 36 provide a very snug fit between the air passage 18 of the mouthpiece 4 and the inner tubular member 20.

Figure 6:
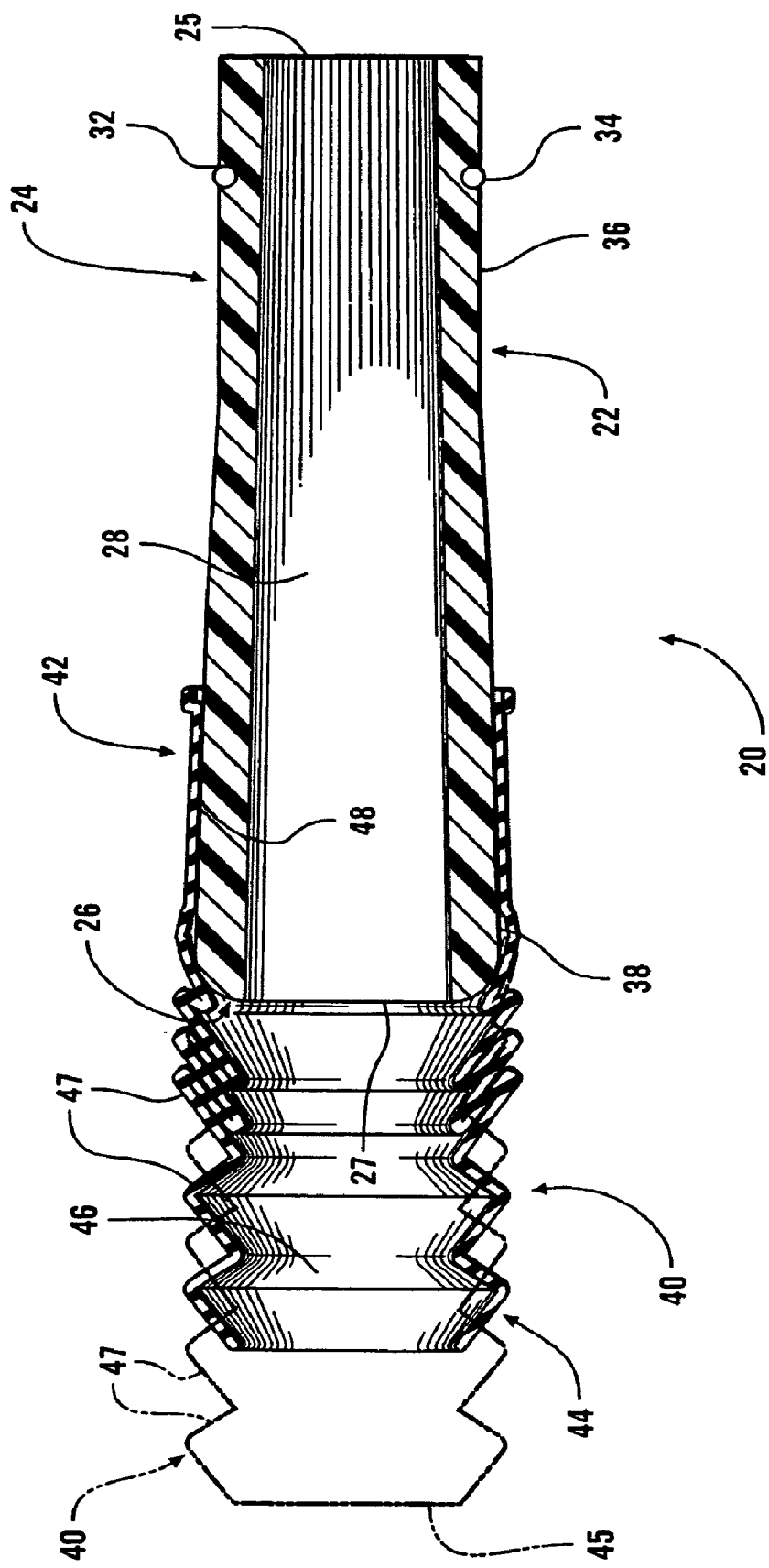
FIG. 6 is a side view of the inner tubular sound chamber of the invention illustrating a corrugated extension section with the corrugations shown fully extended in phantom lines and partially collapsed in full lines.
Figure 7:
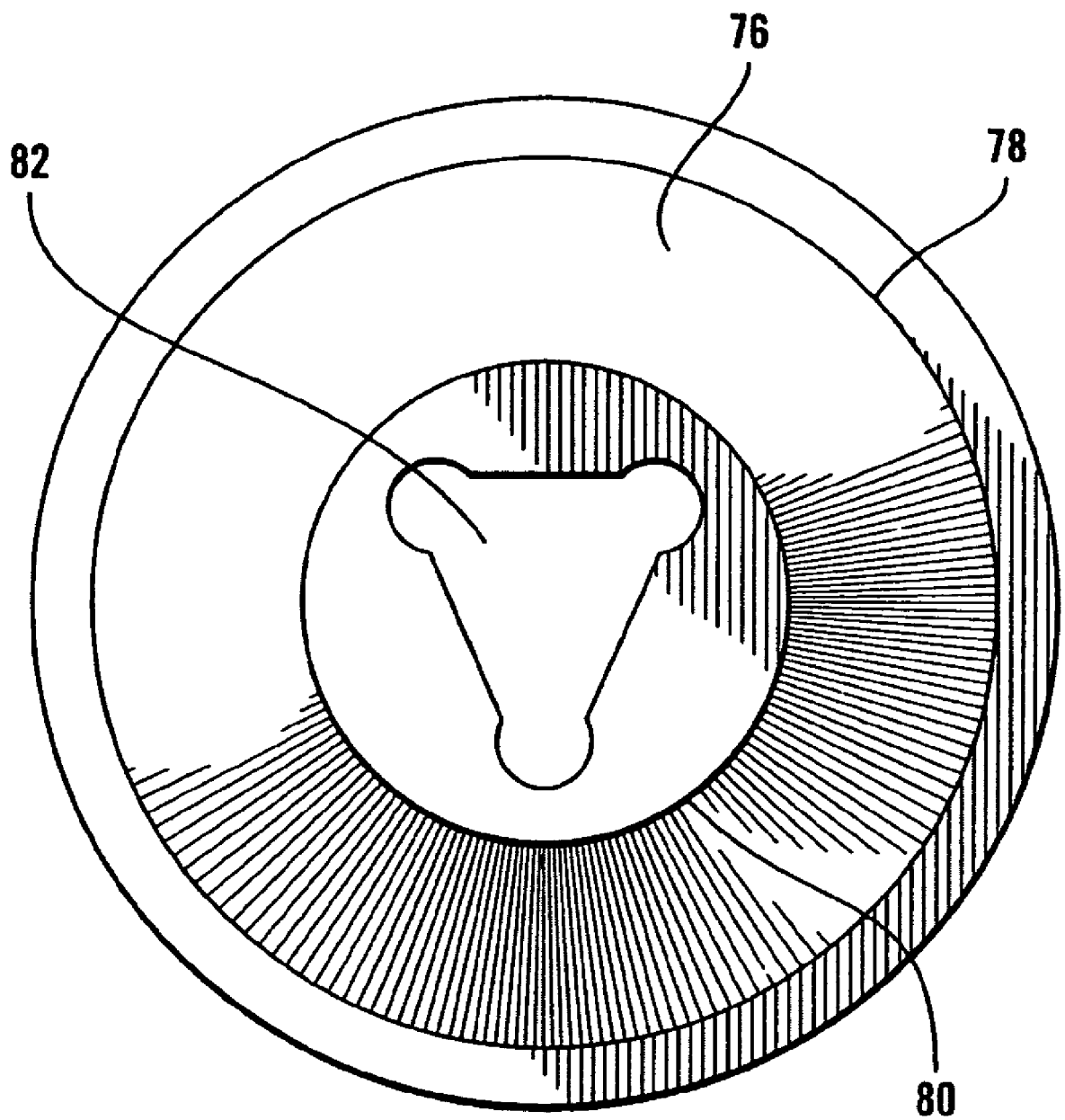
FIG. 7 is an end view showing the air exit opening of the outer tubular sound chamber.

The second cylindrical extension 40, as shown in FIGS. 1, 3 and 6, includes an air inlet end 42, an air outlet end 44 and an air passageway 46 connecting the ends 42 and 44. The air inlet end 42 has an internal cylindrical section 48 having a diameter such that it fits snugly over the cylindrical surface 38 of the air outlet end 26 of the first cylindrical extension 22. Between the cylindrical section 48 and the air outlet end 44 of the second cylindrical extension 40, a plurality of corrugations 47 are formed in the second cylindrical extension 40. As shown in FIG. 6, the corrugations 47 can be fully extended as illustrated in phantom lines or partially collapsed as shown in full lines to thereby adjust the position of the air exit opening 45.

Figure 5:
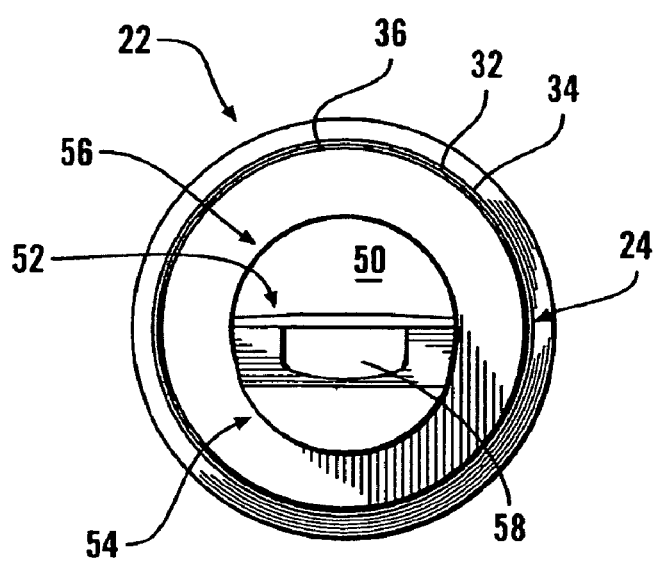
FIG. 5 is an end view of the inlet end of an inner tubular sound chamber with a reed assembly mounted in the chamber.

With reference to FIGS. 1, 3 and 5, a reed assembly 50 is shown mounted in the air inlet opening 25 of the first cylindrical extension 22. The reed assembly includes a vibrating reed 52, a sounding board 54, and a wedge 56 and a wedge end 58 at the end at which the wedge is located. At the wedge end 58 of the assembly 50, the assembly has an essentially cylindrical shape having a slightly larger diameter than the air inlet opening 25 of the first cylindrical extension 22 such that insertion of the reed assembly 50 at the wedge end 58 results in a tight fit of the reed assembly 50 in the first cylindrical extension 22 holding the reed assembly 50 affixed to the extension 22. The sounding board 54 includes a trough 58 along its length which can be seen in FIGS. 1 and 5, and which provides an air passage between the air passage 18 of the mouthpiece 4 and the air passageway 28 of the first cylindrical extension 22. When a user blows into the air opening 5 of the mouthpiece 4, the air passing through the trough 58 of the reed assembly and into the inner tubular sound chamber 20 at a predetermined velocity causes the reed to vibrate against the sounding board 54 to produce sound.

Figure 2:
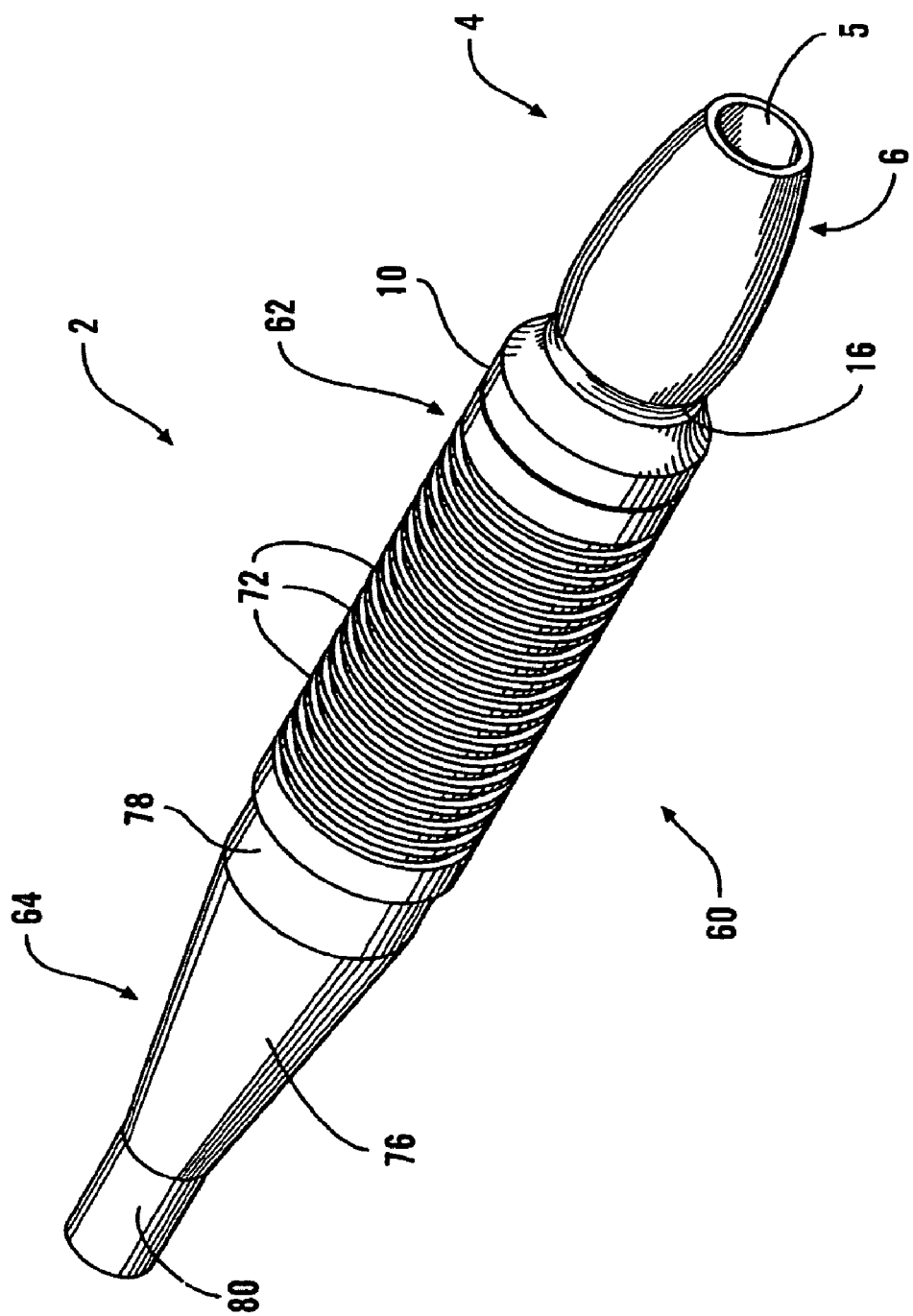
FIG. 2 is a perspective view of the assembled game call apparatus of the invention.
Figure 4:
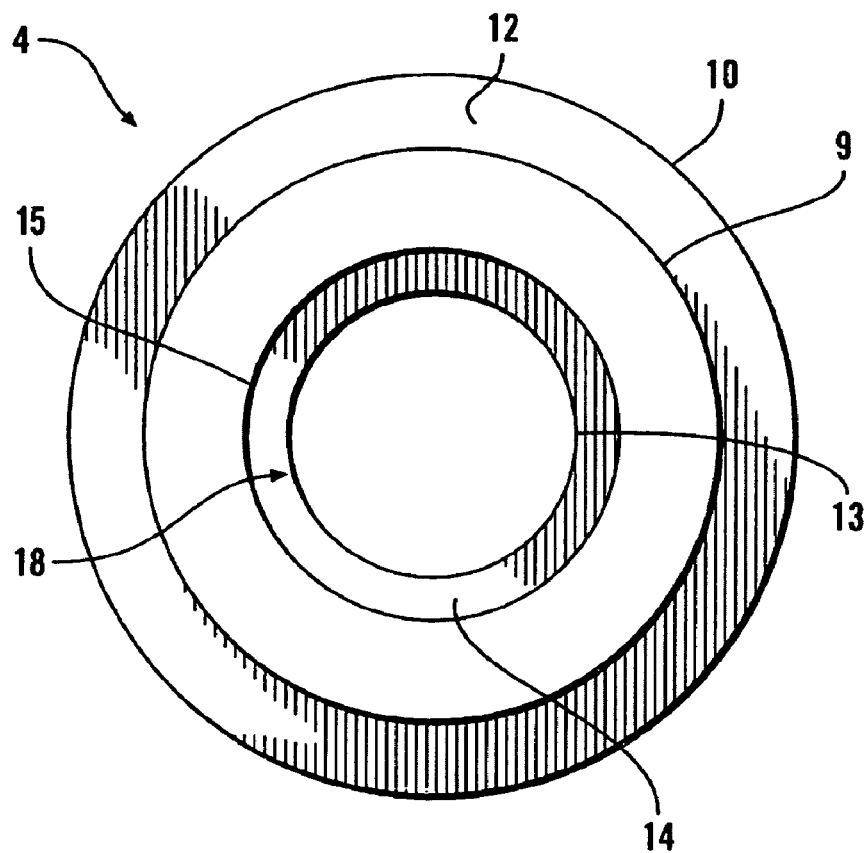
FIG. 4 is an end view of the outlet end of the mouthpiece of the game call apparatus of the invention.

The game call apparatus 2 further includes an outer tubular sound chamber 60 having a cylindrical attachment end 62, an air exit end 64 and an internal cylindrical surface 66 connecting the attachment and air exit ends, as illustrated in FIGS. 1-3. An attachment area 68 having a flat radially extending face 70 is provided at the cylindrical attachment end 62 for snugly fitting the cylindrical attachment end 62 over the outer cylindrical surface 9 and against the flat face 12 of the flange 10 adjacent the air outlet end 8 of the mouthpiece 4. A plurality of circumferential grooves 74 and ridges 72 are provided in the cylindrical surface of the outer tubular member 60 to assist a user in firmly gripping the apparatus. Adjacent the air exit end 64 of the outer tubular member 60, a tapered section 76 is provided which decreases the large internal diameter section 78 from a diameter a to a small internal diameter b at the small diameter section 80. An air exit opening 82 is provided in the small diameter section 80, as shown in FIG. 4, which has a smaller cross-section area than that of the air exit 45 of the second cylindrical extension 40. The material of the tubular sound chamber 60 is a rubber compound having a Shore A hardness of not greater than 90 as measured with a durometer.

With respect to the operation of the game call apparatus, a significantly improved deer call is provided by the tapered constriction of the outer tubular member 60 which causes an air back pressure resulting in a more mellow, deep tonal quality in the growling sound of a rutted buck. The back pressure also assists with improved control of the call so that highly realistic growling, grunting and popping sounds can be produced. The constriction caused by the smaller exit opening 82 in the outer sound chamber also assists with providing the realistic sound.

Another benefit of the game call of the invention relates to the problem that air blown by users through the reed assembly of game calls is often at too high of a velocity. This causes the reed to seize and not vibrate as desired. In the game call disclosed herein the tapered outer tubular sound chamber and the smaller air exit opening from the apparatus decreases the air velocity through the reed assembly so that it is less prone to seizing. This permits air blowing into the mouthpiece that may otherwise be too hard to nevertheless produce a desirable tone quality at the reed.

It will be understood that the forgoing description of the present invention is for purposes of illustration only and that the invention is susceptible to a number of modifications or changes, none of which entail any departure from the spirit and scope of the present invention as defined in the hereto appended claims.

What is claimed is:

1. A game call apparatus comprising:
   a mouthpiece having an air inlet opening and an air outlet opening;
   an inner tubular sound chamber having an air inlet opening connected to the air outlet opening of the mouthpiece and an air outlet opening having a predetermined opening size; and
   an outer tubular sound chamber, the inner tubular sound chamber has a length extending into the outer tubular sound chamber such that the air outlet opening is positioned in the outer tubular sound chamber, the outer tubular sound chamber having an air exit end including an air exit opening having an opening size smaller than the air outlet opening of the inner tubular sound chamber.

2. The game call apparatus in accord with claim 1 wherein the air exit end of the outer tubular sound chamber includes a cylindrical wall which tapers radially inward and toward the air exit opening.

3. The game call apparatus in accord with claim 1 wherein the inner tubular sound chamber includes a plurality of connected corrugations forming an air tube including the air outlet opening of the inner tubular sound chamber and, the corrugations being extendible and collapsible to adjust the extension length of the inner tubular sound chamber into the outer tubular sound chamber.

4. The game call apparatus in accord with claim 1 wherein the inner tubular sound chamber is positioned entirely within the outer tubular sound chamber.

5. The game call apparatus in accord with claim 1 wherein:
   the mouthpiece has an air outlet end including the air outlet opening;
   the inner tubular sound chamber has an air inlet end including the air inlet opening,
   the outer tubular sound chamber has an entrance end through which the inner tubular sound chamber extends into the outer tubular chamber; and
   the air inlet end of the inner tubular sound chamber and the entrance end of the outer tubular sound chamber are both affixed to the air outlet end of the mouthpiece.

6. The game call apparatus in accord with claim 1 wherein the outer tubular sound chamber comprises rubber having a Shore A hardness of not greater than 90.

7. A game call apparatus comprising:
   a mouthpiece having an air inlet opening and an air outlet opening;
   an inner tubular sound chamber having an air inlet opening and an air outlet opening, the air inlet opening of the inner tubular sound chamber being coupled to the air outlet opening of the mouthpiece; and
   an outer tubular sound chamber, the inner tubular sound chamber being located entirely within the outer tubular sound chamber and the air outlet opening of the inner tubular sound chamber opening into the outer tubular sound chamber, the outer tubular sound chamber having an air exit opening through which air from the inner tubular sound chamber escapes from the game call apparatus.

8. The game call apparatus in accord with claim 7 wherein:
   the inner tubular sound chamber includes a corrugated tube forming an air outlet end at which the air outlet opening of the inner tubular sound chamber is located, the corrugated tube having corrugations which can be collapsed or extended to adjust the distance of the air outlet opening of the inner tubular sound chamber from the air exit opening of the outer tubular sound chamber, the air outlet opening of the inner tubular sound chamber having a predetermined opening size; and
   the outer tubular sound chamber includes an air exit end including said air exit opening, the air exit end having a cylindrical wall which tapers radially inward and toward the air exit opening.

9. The game call apparatus in accord with claim 8 wherein the inner and outer tubular sound chambers are both removably mounted to the mouthpiece.

10. The game call apparatus in accord with claim 7 wherein the air outlet opening size of the inner tubular sound chamber is not less than the air inlet opening size of the mouthpiece.

11. A game call apparatus comprising:
   a mouthpiece having an air inlet end and an air outlet end and an air passage connecting the two ends, the air outlet end having an axially extending annular portion having a distal end, an internal cylindrical section defining an air outlet opening and including a radially inward shoulder, an external cylindrical surface, and a flange spaced apart from said distal end and projecting radially outward from the external cylindrical surface;
   an outer tubular sound chamber including a first end, and a second end extending axially away from the mouthpiece, the first end having a cylindrical internal surface removably friction fitted over the external cylindrical surface and abutting the flange of the mouthpiece, the second end having an air exit opening for the game call apparatus; and
   an inner tubular sound chamber extending axially away from the mouthpiece entirely within the outer tubular sound chamber and including an air inlet end and an air outlet end, the air inlet end of the inner tubular sound chamber having a cylindrical shape removably inserted in the internal cylindrical section of the mouthpiece, the air outlet end of the inner tubular sound chamber having an air outlet opening into the outer tubular sound chamber intermediate the first and second ends of the outer tubular sound chamber.

12. The game call apparatus in accord with claim 11 wherein the second end of the outer tubular sound chamber has a tapered section along which the outer tubular sound chamber tapers inward toward the axis of the outer tubular sound chamber and toward the air exit opening.

13. The game call apparatus according to claim 12 wherein:
   the inner tubular sound chamber includes an air inlet at the air inlet end of the inner tubular sound chamber and an internal axially directed passageway connecting the air inlet and the air outlet of the inner tubular sound chamber; and
   a reed assembly inserted into the air inlet of the inner tubular sound chamber and extending generally axially into the air passage of the mouthpiece.

14. The game call apparatus in accord with claim 11 wherein the internal cylindrical section and the external cylindrical surface are positioned concentrically.

15. The game call apparatus in accord with claim 14 wherein the air outlet of the inner tubular sound chamber opens into the outer tubular sound chamber within a tapered section of the outer tubular sound chamber.

* * * * *

UNITED STATES PATENT AND TRADEMARK OFFICE
CERTIFICATE OF CORRECTION

| | | |
|---|---|---|
| PATENT NO. | : 7,658,660 B1 | Page 1 of 1 |
| APPLICATION NO. | : 11/586832 | |
| DATED | : February 9, 2010 | |
| INVENTOR(S) | : Mark A. Drury | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 467 days.

Signed and Sealed this

Thirtieth Day of November, 2010

David J. Kappos
*Director of the United States Patent and Trademark Office*